United States Patent
Kim et al.

(10) Patent No.: US 10,845,758 B2
(45) Date of Patent: Nov. 24, 2020

(54) TRANSMISSIVE HOLOGRAPHIC OPTICAL ELEMENT, METHOD FOR GENERATING THE SAME, AND SCREEN DEVICE INCLUDING TRANSMISSIVE HOLOGRAPHIC OPTICAL ELEMENT

(71) Applicant: KWANGWOON UNIVERSITY INDUSTRY-ACADEMIC COLLABORATION FOUNDATION, Seoul (KR)

(72) Inventors: Eun Soo Kim, Seoul (KR); Yong Seok Hwang, Goyang (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 372 days.

(21) Appl. No.: 16/062,594

(22) PCT Filed: Apr. 23, 2018

(86) PCT No.: PCT/KR2018/004699
§ 371 (c)(1),
(2) Date: Jun. 14, 2018

(87) PCT Pub. No.: WO2019/208840
PCT Pub. Date: Oct. 31, 2019

(65) Prior Publication Data
US 2020/0278640 A1 Sep. 3, 2020

(51) Int. Cl.
*G03H 1/04* (2006.01)
*G02B 5/32* (2006.01)
*G03H 1/02* (2006.01)
*G03H 1/22* (2006.01)
(Continued)

(52) U.S. Cl.
CPC ............ *G03H 1/0402* (2013.01); *G02B 5/32* (2013.01); *G03H 1/0248* (2013.01); *G03H 1/2249* (2013.01); *G03H 1/24* (2013.01); *G03H 1/28* (2013.01); *G03H 2001/0413* (2013.01); *G03H 2001/2271* (2013.01)

(58) Field of Classification Search
CPC ...... G02B 5/02; G02B 5/0205; G02B 5/0252; G03H 1/0402; G03H 1/0248; G03H 1/24; G03H 1/2249; G03H 1/28; G03H 2222/17; G03H 2222/28
See application file for complete search history.

(56) References Cited

FOREIGN PATENT DOCUMENTS

| KR | 201526057 B1 | 6/2015 |
| KR | 20150065137 A | 6/2015 |
| KR | 101550392 B1 | 9/2015 |

(Continued)

OTHER PUBLICATIONS

International Search Report and Written Opinion dated Jan. 22, 20019 for PCT application No. PCT/KR2018/004699.

*Primary Examiner* — Robert E. Tallman (57) ABSTRACT

The present invention suggests a holographic optical element which forms a pattern according to a transmissive hologram recording method based on a multi-diverging object beam and a reference beam, a method for generating the same, and a screen device including the holographic optical element. The holographic optical element according to the present invention includes a base film and a pattern which is formed on the base film by using a transmissive hologram recording method based on a multi-diverging object beam and a reference beam.

14 Claims, 7 Drawing Sheets

(51) Int. Cl.
*G03H 1/24* (2006.01)
*G03H 1/28* (2006.01)

(56) References Cited

FOREIGN PATENT DOCUMENTS

| | | |
|---|---|---|
| KR | 20160120757 A | 10/2016 |
| KR | 20160125798 A | 11/2016 |
| KR | 20180072102 A | 6/2018 |

TRANSMISSIVE HOLOGRAPHIC OPTICAL ELEMENT, METHOD FOR GENERATING THE SAME, AND SCREEN DEVICE INCLUDING TRANSMISSIVE HOLOGRAPHIC OPTICAL ELEMENT

CROSS-REFERENCE TO RELATED APPLICATION

This application is a National Phase of International Application No. PCT/KR2018/004699, filed Apr. 23, 2018, which is hereby incorporated by reference in its entirety.

TECHNICAL FIELD

The present invention relates to a holographic optical element and a method for manufacturing the same, and more particularly, to a transmissive holographic optical element and a method for manufacturing the same. Further, the present invention relates to a transparent screen device using a holographic optical element. This research corresponds to a Holo-Digilog Human Media Research Center Project which is supported by Korea Research Foundation in 2018 (No. 2011-0030079).

BACKGROUND ART

Today, advertising and publicities are taking up a larger portion of sales. Therefore, recently, in addition to advertising using a mass-media such as a television or a radio, there is a growing interest in an advertising which reproduces images in a restricted space while installing the images in a display device. For example, a display device such as a liquid crystal display (LCD), a projection TV, a light emitting display (LED) is installed on a street where there are lots of buildings such as large-size shops and a lot of people come and go to reproduce advertising contents.

However, an operating cost of the display device is expensive and the advertising efficiency is low due to the restriction of the location. Further, it is difficult to install the display device without using an auxiliary tool due to the weight of the display device and the heat generated from the display device.

SUMMARY

The present invention has been made in an effort to suggest a holographic optical element which forms a pattern according to a transmissive hologram recording method based on a multi-diverging object beam and a reference beam and a method for generating the same, and a screen device including the holographic optical element.

However, an object of the present invention is not limited to the above description and other objects which have not been mentioned above will be more apparent to those skilled in the art from a reading of the following description.

The present invention suggests a holographic optical element including a base film; and a pattern which is formed using a transmissive hologram recording method based on a multi-diverging object beam and a reference beam.

The base film may be formed of a volume holographic optical element (VHOE) film.

The transmissive hologram recording method may sequentially use the light related to colors which are combined to generate white as the object beam.

The transmissive hologram recording method may use red related light, green related light, and blue related light as the light related to the colors which are combined to generate white.

The red related light, the green related light, and the blue related light may transmit the base film at different incident angles.

An incident angle of the red related light may be larger than an incident angle of the green related light and an incident angle of the blue related light.

The transmissive hologram recording method may use the red related light, the green related light, and the blue related light in this order as the object beam.

The holographic optical element may be manufactured to be larger than a reference, based on at least one of a hologram recording method which uses a divergent beam as a reference beam, a multi-recording type hologram recording method using mask shifting, and a hologram recording method which performs tiling on a film having a predetermined size on which a pattern is formed.

The transmissive hologram recording method may use a divergent beam or a parallel beam as the reference beam.

The object beam may transmit at least one of a prism sheet, a lens array, and a diffusion plate to be multi-diverged.

When the object beam transmits all the prism sheet, the lens array, and the diffusion plate, the object beam may sequentially transmit the prism sheet, the lens array, and the diffusion plate in this order.

When the reference beam is a divergent beam, the reference beam may transmit at least one of the prism sheet, the lens array, and the diffusion plate.

The lens array may include lenses in which a focal distance is shorter than a diameter.

A shape of the pattern may vary depending on a distance between an element which multi-diverges the object beam and the base film or a target onto which the reference beam is incident.

The present invention suggests a method for generating a holographic optical element including locating a base film in a predetermined point; and forming a pattern on the base film based on a multi-diverging object beam and a reference beam using a transmissive hologram recording method.

In the forming, light related to colors which are combined to generate white may be sequentially used as the object beam. In the forming, red related light, green related light, and blue related light may be used as the light related to the colors which are combined to generate white.

In the forming, the red related light, the green related light, and the blue related light may transmit the base film at different incident angles.

In the forming, when the holographic optical element is manufactured to be larger than a reference, at least one of a hologram recording method which uses a divergent beam as a reference beam, a multi-recording type hologram recording method using mask shifting, and a hologram recording method which performs tiling on a film having a predetermined size on which a pattern is formed may be used as the transmissive hologram recording method.

In the forming, a diverging beam or a parallel beam may be used as the reference beam.

In the forming, the object beam may be multi-diverged using at least one of a prism sheet, a lens array, and a diffusion plate.

In the forming, when all the prism sheet, the lens array, and the diffusion plate, the object beam are used, the object beam may sequentially transmit the prism sheet, the lens array, and the diffusion plate in this order.

In the forming, when the reference beam is a divergent beam, the reference beam may be diverged using at least one of the prism sheet, the lens array, and the diffusion plate.

In the forming, a shape of the pattern may vary by controlling a distance between an element which multi-diverges the object beam and the base film or a target onto which the reference beam is incident.

Further, the present invention suggests a screen device including: a glass element which is formed to have a transparent plate shape, and a holographic optical element which forms a pattern based on a multi-diverging object beam and a reference beam using a transmissive hologram recording method.

The holographic optical element may be laminated on one surface of the glass element and the screen device may further include a coating layer which is laminated on the other surface of the glass element.

The coating layer may be coated to be an anti-reflection (AR) coating layer.

The holographic optical element may be sealed using any one of a thermal compressing method and an adhesive compressing method before being laminated on one surface of the glass element.

The screen device may output an image using a beam output by a beam projector.

The screen device may include the holographic optical element which forms the pattern using a reference beam having different shapes depending on whether a beam output by a beam projector is a parallel beam.

When the beam output by the beam projector is a parallel beam, the holographic optical element may form the pattern using a reference beam which travels in parallel and when the beam output by the beam projector is not a parallel beam, the holographic optical element which forms the pattern using a diverging reference beam.

The screen device may control the size of the viewing zone based on a divergent angle of the lens array which is used to multi-diverge the object beam.

According to the present invention, the following effects may be achieved:

First, optical efficiency is large and luminance is high.

Second, chromatic dispersion is removed so that white may be implemented at all fields of view (FOV).

Third, full color may be represented.

Fourth, a projection angle range of the beam projector may be increased as compared with the related art.

Fifth, image observation is free from light directly transmitted.

Sixth, it is easy to manufacture a large size screen.

Seventh, it may be applied to a field of a beam projector screen or a field of a backlight assembly at a low cost as compared with the related art.

DETAILED DESCRIPTION

Hereinafter, exemplary embodiments of the present invention will be described in detail with reference to the accompanying drawings. In the figures, even though the parts are illustrated in different drawings, it should be understood that like reference numerals refer to the same or equivalent parts of the present invention throughout the several figures of the drawing. Furthermore, when it is judged that specific description on known configurations or functions related in the description of the present invention may unnecessarily obscure the essentials of the present invention, the detailed description will be omitted. Further, hereinafter, exemplary embodiments of the present invention will be described. However, it should be understood that the technical spirit of the invention is not limited to the specific embodiments, but may be changed or modified in various ways by those skilled in the art.

Recently, as an advertising technique which is different from an advertising using mass media, a method of forming a sheet type projection screen and reproducing advertising contents on the projection screen is expanding. For example, according to this method, a transmissive transparent film (rear projection film) is attached on a rear surface of a window of a shop and an advertising image is projected on the transmissive film from a beam projector installed in the shop so that people outside the shop may watch the video projected from the beam projector through the window.

Transparent projection screens may be applied to a wide range of applications and one of applications is applied to an interactive shop windows. So-called holoscreens are used to project information on the screen while allowing the people to view objects behind the screen. However, the holoscreens are opaque so that it has problems of obstructing visibility of the objects behind the shop windows.

In order to solve the above-mentioned problem, the present invention suggests a volume holographic optical element (VHOE) based holographic optical element and a method for manufacturing the same. The holographic optical element suggested by the present invention is suitable for a transparent screen device such as a beam projector screen and has a wide field of view and a high luminance. Further, even though a projection angle by the beam projector has a large inclination angle, the holographic optical element may effectively project an image and represent full color.

Hereinafter, the exemplary embodiment of the present invention will be described in detail with reference to the drawings.

Figure 1:
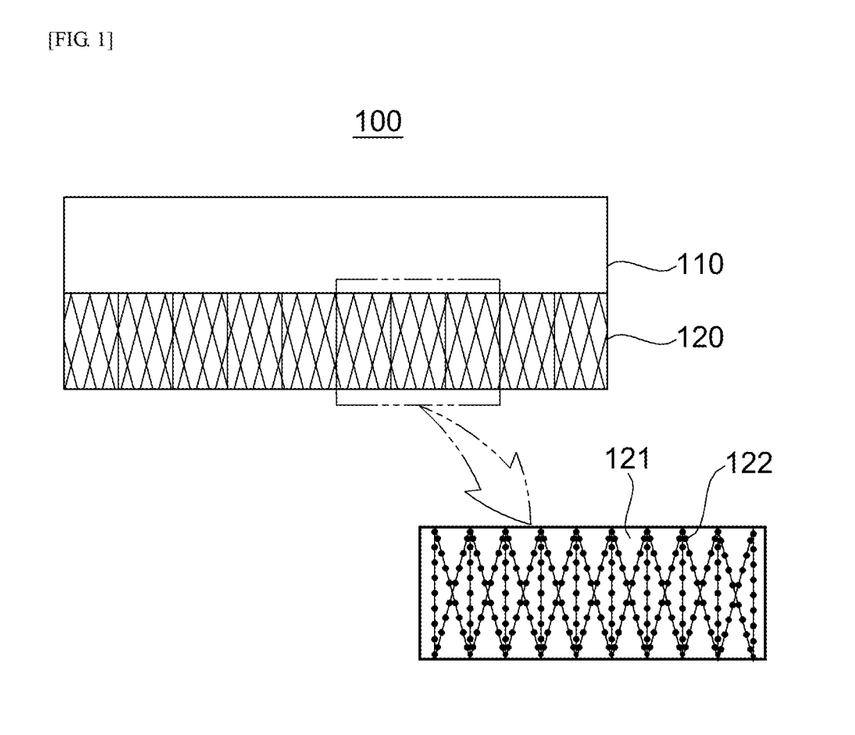
FIG. 1 is a cross-sectional view illustrating a detailed structure of a screen device according to an exemplary embodiment of the present invention.

FIG. 1 is a cross-sectional view illustrating a detailed structure of a screen device according to an exemplary embodiment of the present invention.

Referring to FIG. 1, a screen device 100 includes a glass element 110 and a holographic optical element 120. In the present invention, a beam projector screen may be applied as a screen device 100.

The glass element 110 is manufactured by glass and in the present invention, may be formed to be a transparent glass plate. In the present invention, instead of the glass element 110, other transparent element (for example, an acrylic plate) may also be used.

The holographic optical element 120 is a diffraction plate including volume diffractive elements which are diffracted in a previously designed direction and functions to transmit and diffract light having different wavelength bands in the same direction. The holographic optical element 120 is formed in a single level to be laminated on a bottom surface of the glass element 110.

The holographic optical element 120 may be laminated on a bottom surface of the glass element 110 using a lamination method. The screen device 100 may further include a coating layer (not illustrated). When the holographic optical element 120 is laminated on the bottom surface of the glass element 110, the coating layer may be laminated on a top surface of the glass element 110. The coating layer may be formed to be an anti-reflection (AR) coating layer.

The holographic optical element 120 may be generated by forming a pattern on a volume holographic optical element (VHOE) film using a transmissive hologram recording method. The transmissive hologram recording method will be described in detail with reference to FIGS. 3 and 4.

The holographic optical element 120 may be generated by recording patterns on a VHOE film using a multi-divergent beam having a wide angle used as an object beam. Specifically, color light such as R, G, and B is dispersed and diffracted on the VHOE film using white light as an ambient light source to generate the holographic optical element 120 suggested by the present invention. Further, the dispersed and diffracted color light is superimposed to be diverged so that the holographic optical element 120 may be generated as an element which performs a transparent screen function.

The holographic optical element 120 may be generated by sequentially transmitting red light, green light, and blue light in a predetermined order so that the transparent screen function is performed regardless of a wavelength band of the incident light. Here, the red light means light having a wavelength band related to red R, the green light means light having a wavelength band related to green G, and the blue light means light having a wavelength band related to blue B.

For example, the holographic optical element 120 may be generated as an element which performs a transparent screen function according to the following order.

First, the red light is transmitted onto one surface of the holographic optical element 120 at a first angle. By doing this, primary dispersion and diffraction are reflected to the holographic optical element 120 by the red light.

The first angle may be determined based on an angle between an object beam and a reference beam. The incident angle of the object beam may be determined based on a viewing angle of a viewer who views the screen device 100. Further, an incident angle of the reference beam may be determined based on an incident angle of the projector beam projected onto the screen device 100. In the present invention, the first angle may be determined based on the incident angle of the object beam and the incident angle of the reference angle determined as described above.

Thereafter, the green light is transmitted onto the same surface of the holographic optical element 120 at a second angle. By doing this, secondary dispersion and diffraction are reflected to the holographic optical element 120 by green light, subsequently to the red light.

Light having different wavelength bands forms different diffraction angles while transmitting the screen device. In the present invention, the second angle may be determined based on an unique optical diffraction angle for every wavelength in consideration of the above-description. Since the second angle is related to the diffraction angle for every wavelength, in order to secure a wider field of view by the screen device 100 than that of the related art, the second angle needs to be minimized. Therefore, the second angle may be formed to be much smaller than the first angle.

In the meantime, the wavelength band of the green light is closer to the wavelength band of the red light than the wavelength band of the blue light. In the present invention, the second angle obtained by subtracting a predetermined angle from the first angle is used as an incident angle of the green light in consideration of a chromatic dispersion rule.

Thereafter, the blue light is transmitted onto the same surface of the holographic optical element 120 at a third angle. By doing this, third dispersion and diffraction are reflected to the holographic optical element 120 by blue light, subsequently to the red light and the green light.

Similarly to the second angle, the third angle may be determined based on the unique optical diffraction angle for every wavelength. Similarly to the second angle, the third angle may be formed to be much smaller than the first angle.

In the meantime, the wavelength band of the blue light is closer to the wavelength band of the green light than the wavelength band of the red light. In the present invention, in consideration of the chromatic dispersion rule, the same angle as the second angle is considered as the third angle to be used as an incident angle of the blue light or an angle obtained by adding or subtracting a predetermined angle to or from the second angle is considered as a third angle to be used as an incident angle of the blue light.

In the meantime, if the holographic optical element 120 effectively performs the transparent screen function, the holographic optical element may be generated using light related to colors other than the red light, the green light, and the blue light.

When the holographic optical element 120 is manufactured to have a large size, the holographic optical element may be generated by the following method.

First, the holographic optical element 120 may be generated by recording patterns in a large area using a divergent object beam and a divergent reference beam.

Second, the holographic optical element 120 may be generated by a multi-recording method using a masking technique and a shifting technique.

Third, the holographic optical element 120 may be generated by recording in a large area using a tiling technique.

In the meantime, after generating the holographic optical element 120 and before laminating the holographic optical element on the bottom surface of the glass element 110, the holographic optical element 120 may be sealed using any one of a thermal compressing method and an adhesive compressing method. According to the present invention, the deterioration of the holographic optical element 120 is prevented by the sealing treatment and the holographic optical element 120 may be protected from the external environment.

When the holographic optical element 120 performs the transparent screen function, in order to secure a wide field of view (FOV), the difference between incident angles of light having different wavelength bands may be increased. The field of view of the related art is based on a field of view of a normal scattering white screen. The above-mentioned "wide field of view" means a field of view which is relatively wider than the field of view of the related art.

In the present invention, the holographic optical element 120 may be generated by recording patterns on the VHOE film using interference between the object beam and the reference beam. The shapes of the object beam and the reference beam which are used to generate the holographic optical element 120 may be designed by considering the following matters.

(1) The diffraction efficiency of the incident color light is maximized and the shape of the object beam is designed so as to secure an optimized wide field of view FOV. To this end, the object beam may be designed as follows. First, the object beam may be designed as a beam which forms entirely uniform intensity distribution. Second, the object beam may be designed as a beam having a scattering angle related to the field of view of a normal white screen. Third, the object beam may be designed as a beam having the intensity of maximum efficiency.

(2) A shape of the reference beam is designed to obtain an optimized optical efficiency so as to be act as a transparent screen for projected light. To this end, the reference beam may be designed as follows. First, the reference beam may be designed as a beam which has a screen shape having a desired size and ratio and forms entirely uniform intensity distribution. Second, the reference beam is designed as a beam having a light intensity of a maximum efficiency.

Figure 2A:
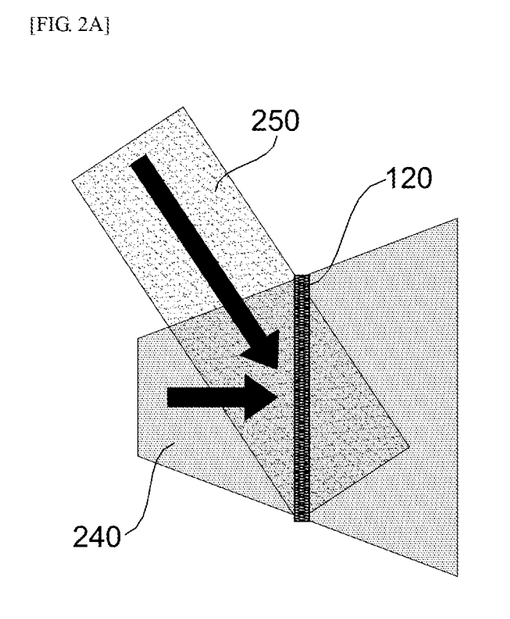
FIGS. 2A and 2B are referential views illustrating incident patterns of an object beam and a reference beam which are used to generate a holographic optical element suggested by the present invention.
Figure 2B:
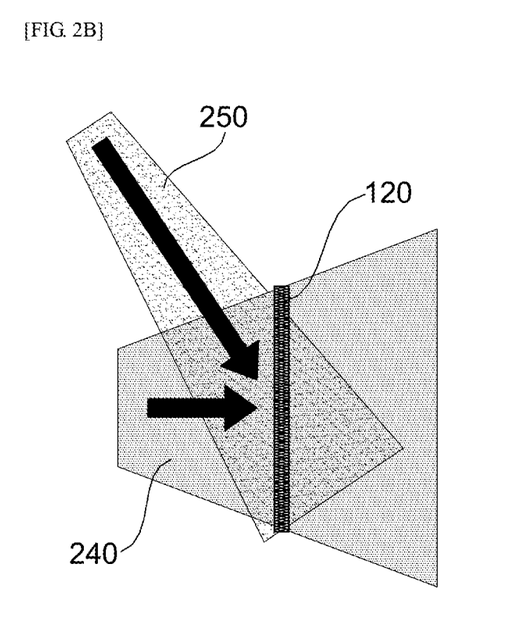

FIGS. 2A and 2B are referential views illustrating incident patterns of an object beam and a reference beam which are used to generate a holographic optical element suggested by the present invention.

The object beam 240 is incident onto the holographic optical element 120 in the form of diverging light as illustrated in FIGS. 2A and 2B. In contrast, the reference beam 250 is incident onto the holographic optical element 120 in the form of a parallel beam as illustrated in FIG. 2A or is incident onto the holographic optical element 120 in the form of diverging light as illustrated in FIG. 2B. In the present invention, in order to obtain a wider field of view, both the object beam 240 and the reference beam 250 may be incident onto the holographic optical element 120 in the form of diverging light.

The holographic optical element 120 may be generated using a lens array, a prism sheet, and a light diffusion plate to obtain an optimized wide field of view, which will be described below.

Figure 3:
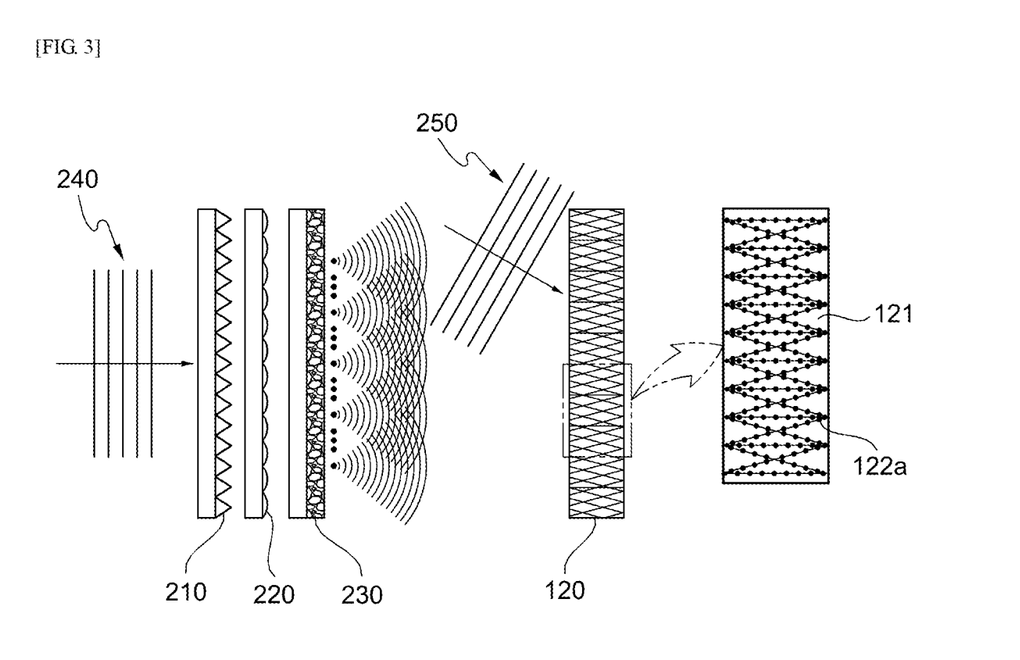
FIG. 3 is an exemplary view of a first exemplary embodiment for explaining a method for generating a holographic optical element suggested by the present invention.

FIG. 3 is an exemplary view of a first exemplary embodiment for explaining a method for generating a holographic optical element suggested by the present invention.

First, the object beam 240 is sequentially incident onto a prism sheet 210, a lens array 220, and a diffusion plate 230 in STEP A.

Thereafter, the object beam 240 which sequentially passes through the prism sheet 210, the lens array 220, and the diffusion plate 230 and the reference beam 250 are simultaneously incident onto the holographic optical element 120 in STEP B.

The object beam 240 sequentially passes through the prism sheet 210, the lens array 220, and the diffusion plate 230 and the reference beam 250 to be incident onto the holographic optical element 120 in the form of a multi-diverging beam. In the present invention, in order to ensure transparency, the object beam 240 may be formed as a multi-diverging beam using the prism sheet 210, the lens array 220, and the diffusion plate 230.

The reference beam 250 has a different incident angle from that of the object beam 240 with respect to one surface of the holographic optical element 120. Differently from the object beam 240, the reference object 250 is incident onto the holographic optical element 120 without passing through the prism sheet 210, the lens array 220, and the diffusion plate 230. In this case, the reference beam 250 may be incident onto the holographic optical element 120 in the form of a parallel beam and also may be incident onto the holographic optical element 120 in the form of a diverging beam.

Next, a first pattern 122a is formed on the holographic optical element 120 by interference between the object beam 240 and the reference beam 250 in STEP C.

In the present invention, when the object beam is incident onto prepared optical systems 210, 220, and 230 as a parallel beam and wave fronts superimposed by multi-diverging light are obtained, an interference pattern between the wave fronts and the reference beam is recorded on an optical diffraction plate to form the first pattern 122a on the holographic optical element 120.

The prism sheet 210 functions to condense the incident object beam 240. The function of the prism sheet 210 may improve the luminance. In the present invention, a condensing sheet or a condensing lens (for example, a Fresnel lens) other than the prism sheet 210 may be used as long as the condensing sheet or the condensing sheet functions to condense the object beam 240.

The lens array 220 may be configured by convex lenses having a focal length which is shorter than a diameter in order to obtain a wide field of view. However, the present invention is not limited thereto. Therefore, when a condition that the focal length is shorter than the diameter is satisfied, the lens array may be configured by concave lenses other than the convex lenses. Further, the lens array 220 may be configured by a combination of the convex lenses and the concave lenses which satisfy the above-mentioned condition.

The diffusion plate 230 functions to diffuse the object beam 240 which sequentially passes through the prism sheet 210 and the lens array 220 to the entire one surface of the holographic optical element 120. In the present invention, instead of the diffusion plate 230, a diffusion sheet may also be applied.

In the meantime, in the present invention, when the holographic optical element 120 is generated, not all the prism sheet 210, the lens array 220, and the diffusion plate 230 may be provided. When any one of the prism sheet 210, the lens array 220, and the diffusion plate 230 is provided, as illustrated in FIGS. 2A and 2B, the diffusion plate 230 may be provided to generate the object beam 240 which is incident onto the holographic optical element 120 in the form of diverging light. Alternately, when two of the prism sheet 210, the lens array 220, and the diffusion plate 230 are selectively provided, any one of the prism sheet 210 and the lens array 220 may be provided together with the diffusion plate 230.

Figure 4:
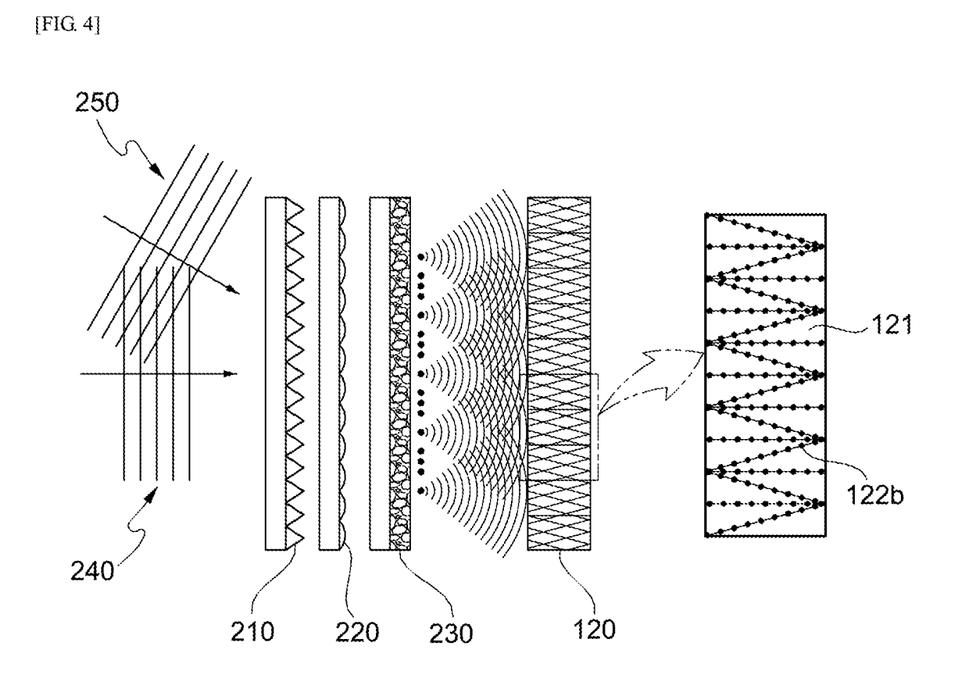
FIG. 4 is an exemplary view of a second exemplary embodiment for explaining a method for generating a holographic optical element suggested by the present invention.

FIG. 4 is an exemplary view of a second exemplary embodiment for explaining a method for generating a holographic optical element suggested by the present invention.

First, the object beam 240 and the reference beam 250 are simultaneously incident onto the prism sheet 210, the lens array 220, and the diffusion plate 230 sequentially. In this case, the object beam 240 and the reference beam 250 have different incident angles with respect to the same surface of the prism sheet 210.

Thereafter, when the object beam 240 and the reference beam 250 sequentially pass through the prism sheet 210, the lens array 220, and the diffusion plate 230, the object beam 240 and the reference beam 250 are incident onto the holographic optical element 120 to form a second pattern 122b on the holographic optical element 120 by the interference between the object beam 240 and the reference beam 250.

Since targets onto which the reference beam 250 is incident (the holographic optical element 120 in FIG. 3 and the prism sheet 210 in FIG. 4) are different, the first pattern 122a formed on the holographic optical element 120 according to the first exemplary embodiment of FIG. 3 and the second pattern 122b formed on the holographic optical element 120 according to the second exemplary embodiment of FIG. 4 have different shapes. However, as illustrated in FIGS. 3 and 4, it should be noted that the patterns 122a and 112b have a constant period and a constant distribution ratio.

The first exemplary embodiment and the second exemplary embodiment for generating the holographic optical element 120 have been described above with reference to FIGS. 3 and 4. According to the first exemplary embodiment of FIG. 3, the object beam 240 is incident onto the holographic optical element 120 in the form of a diverging beam and the reference beam 250 is incident onto the holographic optical element 120 in the form of a parallel beam (see FIG. 2A). In contrast, according to the second exemplary embodiment of FIG. 4, both the object beam 240 and the reference beam 250 are incident onto the holographic optical element 120 in the form of a diverging beam (see FIG. 2B).

The exemplary embodiments will be described with reference to FIG. 1 again.

The holographic optical element 120 includes a base film 121 and a pattern 122 formed on the base film 121.

When exposure is performed in accordance with the interference pattern by the object beam 240 and the reference beam 250, a monomer is coupled to a functional group to be polymerized so that specific shapes are aligned to form the pattern 122.

The shape of the pattern 122 illustrated in FIG. 1 is merely an example and the shape of the pattern 122 in the present invention is not limited thereto. The pattern 122 may have various shapes in accordance with a distance between the diffusion plate 230 and the holographic optical element 120. The distance between the diffusion plate 230 and the holographic optical element 120 may vary depending on characteristics of the screen device 100 such as the uniformity of the optical efficiency and the field of view. That is, when the distance between the diffusion plate 230 and the holographic optical element 120 is set to be narrow, the field of view may be expanded while reducing the uniformity of the optical efficiency and when the distance between the diffusion plate 230 and the holographic optical element 120 is set to be broad, the field of view may be reduced while increasing the uniformity of the optical efficiency. In the above description, in FIG. 3, the distance between the diffusion plate 230 and the holographic optical element 120 means a distance that the object beam 240 travels until the object beam 240 reaches the holographic optical element 120 after being multi-diverged by the diffusion plate 230. Further, in FIG. 4, the distance between the diffusion plate 230 and the holographic optical element 120 means a distance that a combined beam of the object beam 240 and the reference beam 240 travels until the object beam 240 reaches the holographic optical element 120 after being multi-diverged by the diffusion plate 230.

Figure 5:
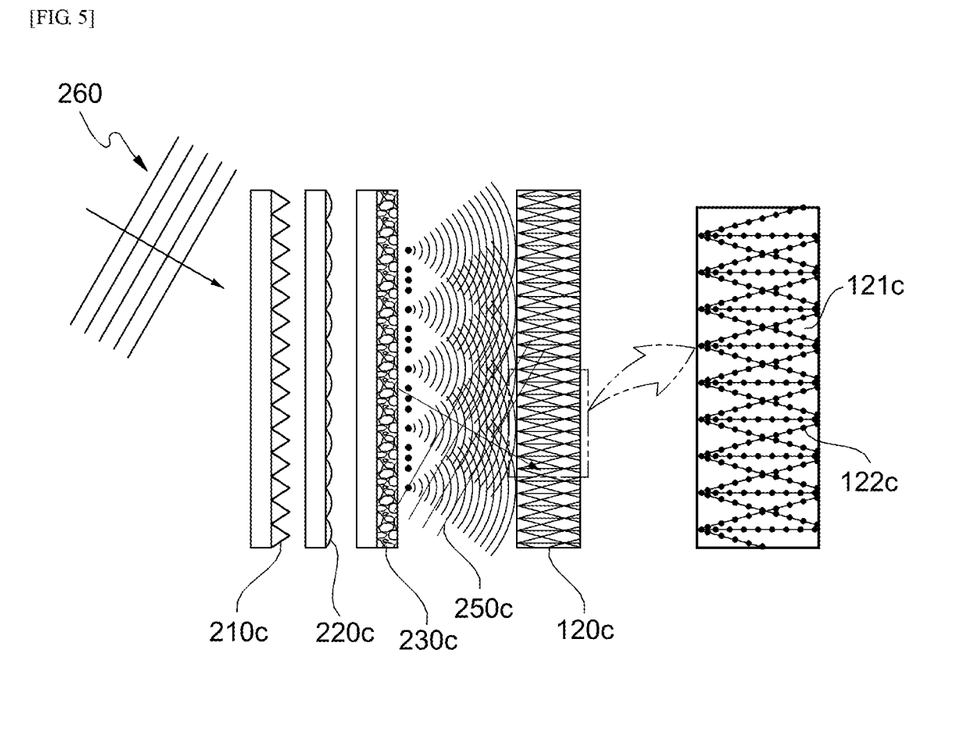
FIG. 5 is an exemplary view of a third exemplary embodiment for explaining a method for generating a holographic optical element suggested by the present invention.

FIG. 5 is an exemplary view of a third exemplary embodiment for explaining a method for generating a holographic optical element according to still another exemplary embodiment of the present invention.

In FIG. 5, an incident beam passes through a plurality of layers of optical elements (may also be configured by a single layer) based on a single beam type input to be divided into an object beam 240c which is formed by diffraction and scattering and a reference beam 250c which transmits in the substantially same direction as the incident direction to straightly travel.

In the exemplary embodiment, although it is exemplified that the incident light 260 is incident in an inclined direction, the incident light 260 may be incident in a vertical direction or may have a parallel and diverging characteristic. The inclination degree at which the incident light 260 is incident may correspond to an inclination angle of a projector beam of a projection image system. The incident light which is vertically incident has the similar characteristic to that of a normal scattering film and a transparency thereof may be adjusted. When a single beam is recorded, an incident direction of the reference beam of the vertically incident beam coincides with an incident direction of the object beam. In this case, similarly to the characteristic of the normal scattering film, it is brightest on the front side and gradually becomes darker at sides. According to the recording characteristic of the hologram, the transparency of the recorded VHOE film may be adjusted in accordance with the recording time. The normal scattering film has a characteristic in that light is randomly scattered so that light is diverged in all directions. Theoretically, the intensities of light are the same in all directions, but actually have a Gaussian distribution depending on a viewing angle. That is, with respect to an inclined incident beam in a specific direction, the larger the angle, the darker the brightness.

The incident light 260 passes through the prism sheet 210c, the lens array 220c, and the diffusion plate 230 or a combination thereof. For example, the incident light 260 may pass through only the diffusion plate 230c. When the incident light 260 passes through the prism sheet 210c, the lens array 220c, and the diffusion plate 230, the incident light 260 passes through the prism sheet 210c, the lens array 220c, and the diffusion plate 230 in this order. The reference beam 250c is a beam which travels while maintaining substantially the same property of the single beam input when the incident light 260 passes through the above-mentioned optical elements. The object beam is a beam which is generated when the incident light loses directivity and is diffracted and scattered while transmitting the above-mentioned optical elements.

Intensities of the object beam and the reference beam which are incident onto the holographic optical element 120c match each other in a predetermined range. When the intensities of the object beam and the reference beam match within a predetermined range, a third pattern 122c is formed on the base film 121 of the holographic optical element by the interference of the object beam and the reference beam. Desirably, the intensity of the object beam and the intensity of the reference beam are equal to each other and the intensities of the object beam and the reference beam may be achieved by adjusting transmittance of the diffusion plate 230c. Specifically, the transmittance of the diffusion plate may be adjusted by adjusting an interval, sizes, an arrangement, and densities of bead particles included in the diffusion plate 230c, selecting a material of the film, adjusting a thickness of the diffusion plate, and a refractive index. As a result, the intensities of the object beam and the reference beam which are incident onto the holographic optical element 120c may be adjusted by adjusting the transmittance of the diffusion plate 230c. When the object beam and the reference beam are incident onto the holographic optical element 120, the third pattern 122c is formed on the base film 121 of the holographic optical element by the interference of the object beam and the reference beam.

Figure 6:
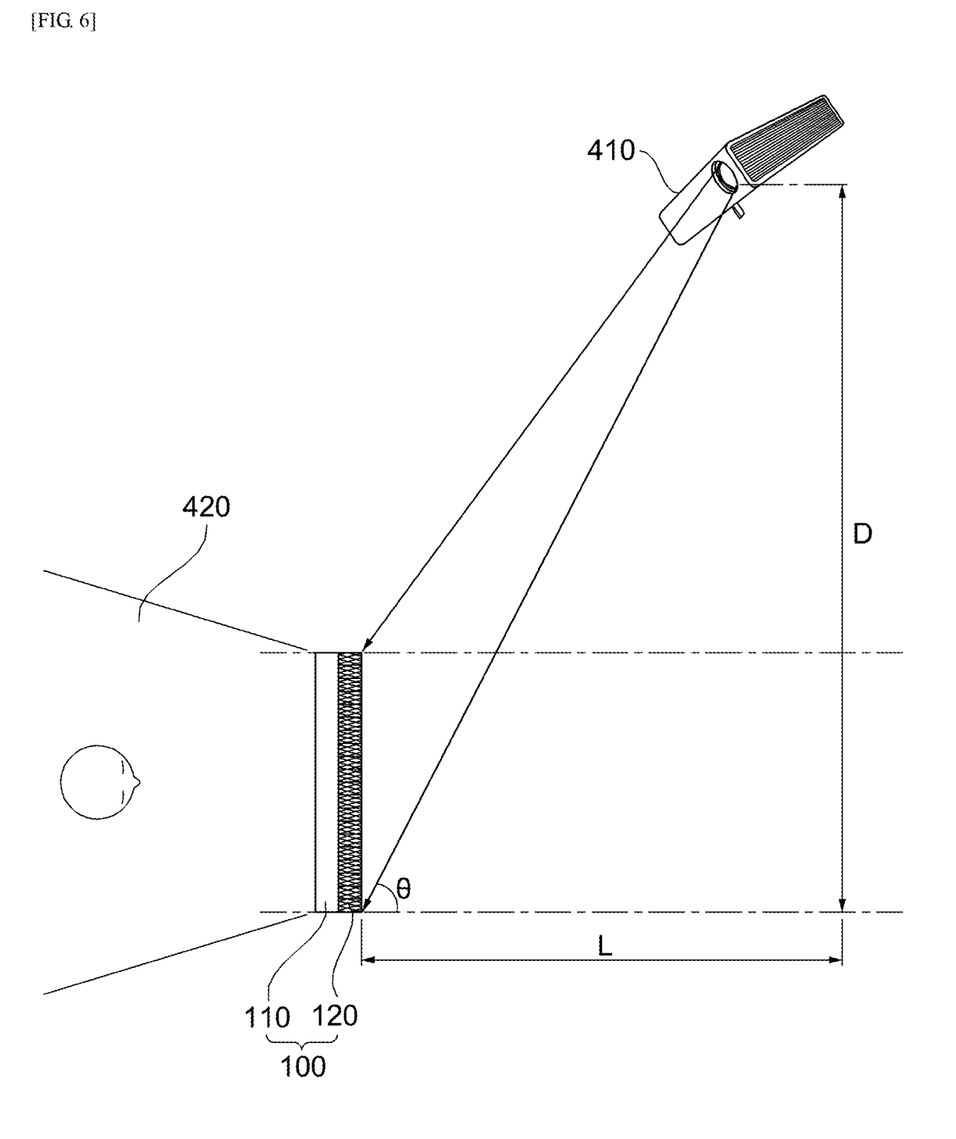
FIG. 6 is a conceptual view for explaining a method for displaying an image using a screen device according to an exemplary embodiment of the present invention.

FIG. 6 is a conceptual view for explaining a method for displaying an image using a screen device according to an exemplary embodiment of the present invention.

FIG. 6 illustrates an optical principle that displays an image on a screen device 100 with a transmissive holographic optical element 120 attached thereto which performs a diffractive diffusing function using light projected from the beam projector 410. Although one beam projector is illustrated in the example of FIG. 6, in the present invention, a plurality of beam projectors 410 may be provided in different directions.

The holographic optical element 120 is laminated on the glass element 110 to be used in order to provide a full color image which is displayed in the presence of a beam output by at least one beam projector 410 near the holographic optical element 120. The holographic optical element 120 is implemented by a transmissive diffractive element which may represent a volume holographic full color.

The holographic optical element 120 may be formed to be a first type in which multi-divergent information is recorded by a first object beam and a first reference beam. The first object beam refers to an object beam which is incident in a multi-divergent state. The first reference beam refers to a reference beam which is incident in any one state of a divergent state, a converged state, and a parallel state. When the holographic optical element 120 is formed to be a first type, a field of view may be wider than that of the related art.

Further, the holographic optical element 120 may be formed to be a second type in which multi-divergent information is recorded by the optical systems 210, 220, and 230 which multi-diverge the second object beam and the second reference beam. The second object beam and the second reference beam refer to an object beam and a reference beam which are incident in any one state of a divergent state, a converged state, and a parallel state. The optical systems 210, 220, and 230 include at least one of the prism sheet 210, the lens array 220, and the diffusion plate 230.

In the meantime, the holographic optical element 120 may be formed to be a third type in which a third object beam is diverged using the diffusion plate 230 and the third object beam is incident to face the incident direction of the third reference beam having any one of a parallel beam and a diverged beam to record the multi-divergent information.

When a projection light source of the beam projector 410 is a parallel beam (or a beam having almost parallel directivity), the holographic optical element 120 may be formed to be a first type. When the projection light source of the beam projector 410 is diverged light or converged light, the holographic optical element 120 may be formed to be a second type.

However, since most of the beam projectors 410 project a divergent beam, in order to form diffractive diffused light which is transparent and has a highest possible optical efficiency from the holographic optical element 120, the reference beam 250 may be formed to be a diverging beam. Further, the object beam 240 may be formed to be a multi-diverging beam in order to obtain a wider field of view suitable for 2D. Further, in order to obtain a holographic diffraction plate which has a wide field of view and does not have color dispersion, the optical systems 210, 220, and 230 may also be used.

When the colored light projected by the beam projector 410 is incident onto the screen device 100, the colored light is diverged and diffracted by the holographic optical element 120 and then the colored light is superimposed by multi-divergence to form white light. In the present invention, a size of a white viewing zone 420 may be controlled based on a divergent angle of a beam by the lens array 220 which is used to generate the holographic optical element 120. As illustrated in FIG. 6, the white viewing zone 420 may be implemented by a V type viewing zone.

In the meantime, a gradient value between the beam projector 410 and the screen device 100 may be calculated by the following Equation.

$$L = D \times \tan(\pi/2 - \theta)$$

In the above Equation, D denotes a vertical distance from the beam projector 410 to one point on a flat plate (for example, the ground) on which the screen device 100 is located. L denotes a horizontal distance from one point on the flat plate to the screen device 100. θ denotes a gradient between the beam projector 410 and the screen device 100, that is, an incident angle of a beam emitted by the beam projector 410 with respect to the screen device 100.

θ may be calculated by the above Equation, as follows.

$$\theta = \arctan(D/L)$$

The beam projection type display device of the related art is mainly a reflective type so that in order to serve as a display element, a separate light receiving element such as a screen is necessary. Since the brightness of the ambient light is limited in the indoor space, the luminance of the beam projection type display element of the related art is higher than that of the ambient light so that there is no problem in using the beam projection type display element of the related art. However, according to the related art, since a screen which is a separate imaging element is manufactured to be a translucent or a transparent display element to be used, luminance loss is very large and light which is directly transmitted from the beam projector affects the image formation, so that the beam projection type display element of the related art still has a big problem to be used as a portable or commercial advertising transparent display.

The best way to solve the fundamental problem as described above is to apply the projected light as a transparent diffractive diffusion element of a full color holographic optical element having a diffraction and diffusion function. The present invention suggests a projected light based transparent holographic screen element configuration and methods for generating the same.

Features of the present invention as described above will be summarized as follows:

First, the present invention provides a full color transparent screen without having color dispersion through a single layer high efficiency holographic optical element 120 which increases an angle between a beam projector 410 which serves as an image projector and a screen device 100 to eliminate influence on the image observation by light which is not diffracted by the screen and is directly transmitted and transmits light having different wavelength bands and diffracts the light on the glass element 110.

Second, the holographic optical element 120 may be configured by a diffraction plate which transmits and diffracts light having a wavelength band related to different colors which have complementary color relationship. Here, the complementary color relationship means a combination (for example, RGB) of colors which become white when different light is mixed. Further, the holographic optical element 120 may be configured to increase divergent angles of the light on the diffraction plate so that the dispersed light is superimposed to have a white field of view.

Third, the screen device 100 is formed such that the holographic optical element 120 is laminated on a rear surface of the glass element 110. In the present invention, the ambient projected light is diffracted and diffused by the screen device 100. That is, according to the present invention, the image information projected by the beam projector 410 is condensed by the holographic optical element 120 which includes single layer volume transmissive diffractive elements and the condensed light is diffracted and transmitted in a re-designed FOV. According to the present invention, the light usage efficiency is maximized by doing this so that the problem of the beam projector screen of the related art is solved and a free incident angle and the full-color display are allowed.

Fourth, the holographic optical element 120 which configures the screen device 100 is formed by a VHOE film. By doing this, the holographic optical element 120 may build a display panel having a high optical efficiency. Further, when the ambient light is restricted in the incident direction, a transparent state of the holographic optical element 120 may be maintained.

Fifth, when the screen device 100 is used as a transparent screen in a projection display field, the full color representation is allowed and the screen device may be used for advertisement or decoration in several indoor spaces like transparent show windows.

The exemplary embodiment of the present invention has been described above with reference to FIGS. 1 to 6. Hereinafter, an exemplary embodiment of the present invention which may be deducted from the exemplary embodiment will be described below.

The screen device suggested by the present invention outputs images using a beam output by the beam projector and includes a glass element and a holographic optical element.

The glass element is formed to be a transparent plate.

The holographic optical element forms a pattern using a transmissive hologram recording method based on a multi-divergent object beam and a reference beam.

The holographic optical element may be sealed using any one of a thermal compressing method and an adhesive compressing method before being laminated on one surface of the glass element.

The holographic optical element may include a base film and a pattern.

The base film may be formed of a volume holographic optical element (VHOE) film.

A pattern is formed on the base film and is formed based on a multi-diverging object beam and a reference beam using a transmissive hologram recording method.

A shape of the pattern may vary depending on a distance between an element which multi-diverges the object beam and the base film or a target onto which the reference beam is incident.

The transmissive hologram recording method may sequentially use the light related to colors which are combined to generate white as the object beam. In the transmissive hologram recording method, as the light related to the colors which are combined to generate white, red related light, green related light, and blue related light may be used. In the transmissive hologram recording method, the red related light, the green related light, and the blue related light are used in this order as the object beam.

In the transmissive hologram recording method, a divergent beam or a parallel beam may be used as the reference beam.

The red related light, the green related light, and the blue related light may be transmitted through the base film at different incident angles. The incident angle of the red related art may be larger than the incident angle of the green related light and the incident angle of the blue related light.

The holographic optical element may be manufactured to be larger than a reference, based on at least one of a hologram recording method which uses a divergent beam as a reference beam, a multi-recording type hologram recording method using mask shifting, and a hologram recording method which performs tiling on a film having a predetermined size on which a pattern is formed.

The object beam may transmit at least one of a prism sheet, a lens array, and a diffusion plate to be multi-diverged. When the object beam transmits all the prism sheet, the lens array, and the diffusion plate, the object beam may sequentially transmit the prism sheet, the lens array, and the diffusion plate in this order. The lens array may include lenses in which a focal distance is relatively shorter than a diameter.

When the reference beam is a divergent beam, the reference beam may transmit at least one of the prism sheet, the lens array, and the diffusion plate.

The screen device may further include a coating layer.

When the holographic optical element is laminated on one surface of the glass element, the coating layer is laminated on the other surface of the glass element.

The coating layer may be formed to be an anti-reflection (AR) coating layer.

The screen device may include a holographic optical element which forms a pattern using reference beams having different shapes depending on whether a beam output by the beam projector is a parallel beam. Specifically, when the beam output by the beam projector is a parallel beam, the screen device may include a holographic optical element which forms a pattern using a reference beam which travels in parallel and when the beam output by the beam projector is not the parallel beam, the screen device may include a holographic optical element which forms a pattern using a diverging reference beam.

The screen device may control the size of the viewing zone based on a divergent angle of the lens array which is used to multi-diverge the object beam.

Next, a method for generating a holographic optical element will be described.

First, a base film is located on a predetermined point (STEP 1).

Next, a pattern is formed on a base film using a transmissive hologram recording method based on a multi-diverging object beam and a reference beam (STEP 2).

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

If it is not contrarily defined in the detained description, all terms used herein including technological or scientific terms have the same meaning as those generally understood by a person with ordinary skill in the art. A generally used terminology which is defined in a dictionary may be interpreted to be equal to a contextual meaning of the related technology but is not interpreted to have an ideal or excessively formal meaning, if it is not apparently defined in the present invention.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. A holographic optical element, comprising:
   a base film; and
   a pattern which is formed in the base film using a multi-diverging object beam and a reference beam in a transmissive hologram recording method,
   wherein, in the transmissive hologram recording method, a shape of the pattern is changed by adjusting the uniformity of optical intensity of the reference beam depending on a distance that the object beam travels until reaching the holographic optical element after transmitting a diffusion plate, and the shape of the pattern varies depending on whether the reference beam transmits the diffusion plate.

2. The holographic optical element according to claim 1, wherein the base film is formed by volume holographic optical element (VHOE) film.

3. The holographic optical element according to claim 1, wherein the transmissive hologram recording method sequentially uses light related to colors which are combined to generate white as the object beam.

4. The holographic optical element according to claim 3, wherein the transmissive hologram recording method uses red related light, green related light, and blue related light as the light related to the colors which are combined to generate white.

5. The holographic optical element according to claim 4, wherein, in the transmissive hologram recording method, the red related light, the green related light, and the blue related light transmit the base film at different incident angles.

6. The holographic optical element according to claim 1, wherein the object beam and the reference beam are formed after incident light passes through the diffusion plate in the transmissive hologram recording method.

7. The holographic optical element according to claim 1, wherein the holographic optical element is manufactured to be larger than a reference, based on at least one of a hologram recording method which uses a divergent beam as the reference beam, a multi-recording type hologram recording method using mask shifting, and a hologram recording method which performs tiling on a film having a predetermined size on which a pattern is formed.

8. The holographic optical element according to claim 1, wherein the transmissive hologram recording method uses a divergent beam or a parallel beam as the reference beam.

9. The holographic optical element according to claim 1, wherein the object beam transmits one or more of a prism sheet, a lens array, and a diffusion plate to be multi-diverged in the transmissive hologram recording method.

10. The holographic optical element according to claim 9, wherein when the object beam transmits all the prism sheet, the lens array, and the diffusion plate in the transmissive hologram recording method, the object beam sequentially transmits the prism sheet, the lens array, and the diffusion plate in this order.

11. The holographic optical element according to claim 9, wherein when the reference beam is a divergent beam, the reference beam transmits one or more of the prism sheet, the lens array, and the diffusion plate in the transmissive hologram recording method.

12. The holographic optical element according to claim 9, wherein the lens array includes lenses, each of the lenses having a diameter and a focal distance that is shorter than the diameter.

13. The holographic optical element according to claim 1, wherein a shape of the pattern varies depending on a distance between an element which multi-diverges the object beam and the base film or a target onto which the reference beam is incident.

14. A method for forming a holographic optical element, the method comprising:
   locating a base film in a predetermined position; and
   forming a pattern in the base film using a multi-diverging object beam and a reference beam in a transmissive hologram recording method,
   wherein, in the transmissive hologram recording method, a shape of the pattern is changed to adjust the uniformity of optical efficiency of a screen device by adjusting a distance that the object beam travels until reaching the holographic optical element after transmitting a diffusion plate, the screen device including the holographic optical element, and the shape of the pattern varies depending on whether the reference beam transmits the diffusion plate.

* * * * *